United States Patent [19]
McGuire

[11] Patent Number: 4,868,900
[45] Date of Patent: Sep. 19, 1989

[54] CREDIT CARD VERIFIER

[75] Inventor: John F. McGuire, Bray, Ireland

[73] Assignee: Trintech Limited, Bray, Ireland

[21] Appl. No.: 78,329

[22] Filed: Jul. 27, 1987

[30] Foreign Application Priority Data

Jul. 25, 1986 [IE] Ireland ................... 1966/86

[51] Int. Cl.⁴ ............................................. G06K 5/00
[52] U.S. Cl. .................................... 235/380; 235/379; 902/39
[58] Field of Search .................... 235/379, 380; 340/33

[56] References Cited
U.S. PATENT DOCUMENTS

| | | | |
|---|---|---|---|
| 3,394,246 | 7/1968 | Goldman | 235/380 |
| 3,798,602 | 3/1974 | Hynes | 340/825.33 |
| 4,694,147 | 9/1987 | Amemiya et al. | 235/379 |

Primary Examiner—David L. Trafton
Attorney, Agent, or Firm—Sughrue, Mion, Zinn, Macpeak and Seas

[57] ABSTRACT

A point-of-sale credit card verifier for checking the validity of cards, such as credit cards, comprises means for non-destructively storing information on invalid credit cards for comparison with information which is read from a card presented for use. The information on invalid credit cards is transmitted by signals embedded in a VHF stereo radio broadcast from a broadcast station which is received by a VHF receiver/demodulator. A credit card sensor and control maintains the verifier switched off unless a credit card is to be read. The verifier is switched on when information is about to be broadcast from a broadcast station. The verifier operates quickly and independently of telecommunications networks.

6 Claims, 1 Drawing Sheet

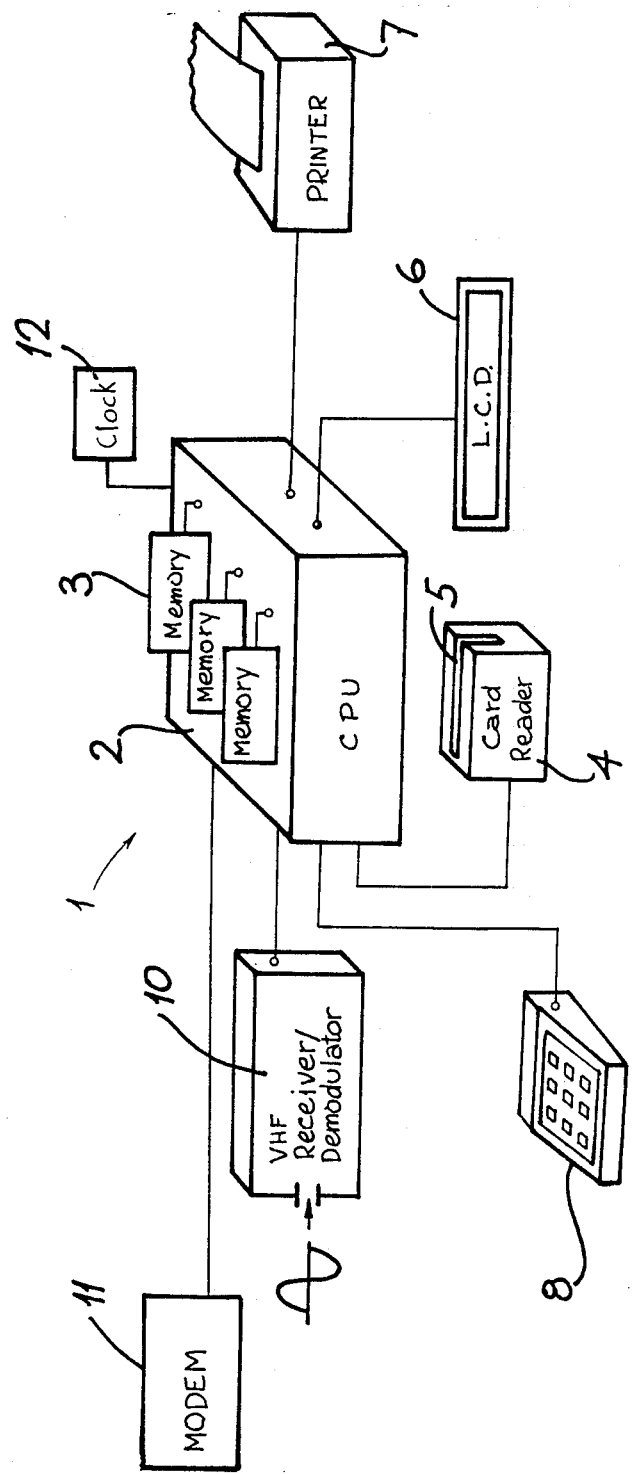

CREDIT CARD VERIFIER

BACKGROUND OF THE INVENTION

Introduction

The present invention relates to the verification of credit cards, bank cards, or other identification cards, hereinafter referred to as credit cards.

Field of the Invention

One of the biggest problems associated with the widespread use of credit cards is that of checking their validity and the standing of their associated bank accounts at a point-of-sale. In an effort to overcome this problem many retailers consult a printed list of invalid cards, which is sent to them by credit card companies. This, however, is extremely time-consuming and further, such lists are generally out of date by the time the retailer receives them. Alternatively, retailers sometimes make a telephone call to the credit card company to obtain information about credit cards. Needless to say, this is also extremely time-consuming and expensive and, generally speaking, it is not feasible to check every credit card by telephone.

More recently, credit card verifiers have been developed which communicate with a remote central computer to obtain information about the status of a credit card. For example, U.S. patent specification No. 4,023,014 (Goldberg) describes such a credit card verifier having a tone generator for emitting code-identifying tones to a remote computer by a telephone cable or direct cable. The tone generator is manually set by a user, after the credit card number and other details have been determined. The remote computer will, in turn, transmit a signal to the credit card verifier along the same cable to indicate the status of the credit card. U.S. patent specification No. 4,016,404 (Appleton) describes a credit card verifier which operates on the same principle. This credit card verifier also has a facility for comparing a user-inputted code signal with code signal read from the credit card.

The principle of having a credit card verifier connected by cable to a central computer is also disclosed in U.S. patent specification No. 3,793,624 (Vaskunas). In this case, signals transmitted from the remote computer to the point-of-sale credit card verifier will not only indicate the status of the credit card but they also to some extent control the operation of the credit card verifier. For example, a signal transmitted from the remote computer which indicates that the credit card is valid and that the bank account is in good standing, will control the operation of a printer to print the necessary form at the credit card verifier.

These credit card verifiers, however, suffer from some major disadvantages. One of the most critical characteristics of a credit card verifier is the speed of its operation. It will be appreciated that a busy cashier using one of the present verifiers requires a considerable amount of time to firstly determine the credit card number and the details and secondly, to manually instruct the verifier to transmit signals to the remote computer. Further delays may occur if the remote computer is heavily loaded, in which case the user may have to repeat the procedure several times.

A further problem with known credit card verifiers which communicate with a remote computer by telephone or other cable is that noise interference on this cable will at best mean that a new connection must be made and at worst provide wrong information.

The communication costs involved in operating such credit card verifiers are quite high, irrespective of whether a switched line or a direct line is used. If a switched line is used a connection will generally have to be maintained with the communications network, throughout business hours.

It is an object of this invention to provide a credit card verifier which, in use, operates more quickly and cost-effectively than those available at present.

It is a further object of the invention to provide a credit card verifier which is less expensive and more reliable than those available at present.

In this specification, the term "invalid card" is intended to cover cards such as credit cards, bank cards or any identification cards which store electronically readable information, which cards have been lost, stolen, altered by an unauthorized person or represent bank accounts from which money should not be withdrawn. Many cards may not be strictly speaking, invalid, in that there might be no reason not to accept them, but they may have credit limits or indeed may have spending limits set by the credit card company about which the credit card company may take some action to guard against fraud. Thus, it is not, strictly speaking, correct to talk of invalid cards, but more properly and generally of cards requiring some action by their recipient. However, since the major problem is fraud, the term "invalid card" is the most appropriate.

SUMMARY OF THE INVENTION

According to the invention there is provided a credit card verifier comprising:

a radio signal receiver forming reception means for receiving information on invalid cards from a central control station;

memory means for storing the information received as stored data;

reading means for reading encoded data on the card;

comparison means for comparing the encoded data and the stored data; and output means for delivering a signal in response to said comparison.

The present invention obviates the need for the recipient to use a telephone line and it is portable and independent of telephone lines or other cable. It is less expensive, as there is not a telephone cost associated with many transactions. With this invention, there is no need for the credit card company to send out warning lists, again at considerable cost. Further, such lists take time to come into operation and there is often an unacceptable time lag in alerting credit card recipients. The recipient is also spared the task of consulting such lists.

It is possible to check all transactions rather than selected ones as at present, since every card is compared automatically with the credit card company's list of invalid cards.

Additionally, the present invention allows simultaneous and instantaneous updating of all recipient records.

The use of a radio receiver is essential for the present invention. While it would appear that there is relatively little difference between the use of radio and a telephone/cable link, this view fails to appreciate the essential feature of radio for this application. When the communication is substantially one way, radio has considerable advantages as radio receivers are cheap and there is no limit to the numbers that can be used. It is this flexibility of radio that has not been appreciated heretofore for this operation. The logistics of contacting each unit in the field is overcome by the present invention.

All solutions proposed to solve the problem of credit card verification have operated on the principle of the user checking with a central control. The present invention, in effect, operates in reverse and is not by any means an obvious solution to a difficult problem.

BRIEF DESCRIPTION OF THE DRAWING

The invention will be more clearly understood from the following description of an embodiment thereof given by way of example only with reference to the accompanying drawing which is a schematic perspective view of an apparatus according to the invention.

DETAILED DESCRIPTION OF THE INVENTION

Referring to the drawing there is illustrated a credit card verifier for bank cards or other identity cards at a point-of-sale, indicated by the reference numeral 1. The verifier 1 includes a Central Processing Unit (CPU) 2. The CPU 2 is connected to a memory bank 3 having 32 K bytes of Read Only Memory (ROM) and 512 K bytes of Random Access Memory (RAM). A card reading means, in this case, a magnetic card reader 4 having a slot 5 for reception of cards is also connected to the CPU 2. A Liquid Crystal Display (LCD) 6, a printer 7 and a keypad 8 are also connected to the CPU 2.

The verifier 1 includes a radio signal receiver namely a VHF receiver/demodulator 10 and a modem 11. These will be described in more detail below. The verifier 1 is powered by a battery (not shown) consisting of 6×1.2 V NiCd cells and 1×5 V Li cell. A battery charging circuit (not shown) is connected to both the CPU 2 and to the batteries. The charge rate for the batteries is 200 mA for the first 5 hours of charging and 20 mA trickle charge from then onwards.

A real time clock 12, comprising a CMOS counter driven by a low-drift crystal is also connected to the CPU 2. The verifier 1 further includes various visual indicators comprising Light Emitting Diodes (LEDs). The main visual indicators are for indicating low battery output voltage, absence of received signal, and power-on.

Telephone jacks are provided for the modem 11. One jack connects the verifier 1 to a telephone line, and another connects a standard telephone handset to a telephone line in parallel with the modem 11.

In use, the verifier 1 may be initialised by inputting all data on existing invalid cards through the keypad 8 through a serial link with a computer or through the modem 11 from a central control computer. The verifier 1 is then ready for use at the point-of-sale. Meanwhile, companies which issue credit cards and other such cards transmit the numbers and other data of invalid cards on-line to the central control computer. The central control computer immediately transmits this information on-line to the local broadcasting station, which transmits the information embedded in VHF signals forming part of a stereo broadcast. The information is encoded at the broadcast station to be transmitted on a 57 KHz subcarrier using differential bi-phase encoding. The subcarrier is then added to the lower frequency stereo signal and modulated on to the FM main carrier. The information transmitted can be alphanumeric. The VHF receiver/demodulator 10 receives these radio signals, processes them and in turn transmits them to the CPU 2. The CPU 2, in turn, directs the information to be stored to the memory bank 3. When a card is to be verified it is inserted in the card reader slot 5 and the read data is transmitted to the CPU 2 where it is compared with the information on invalid cards, obtained from the memory bank 3. The status of the card is then displayed on the LCD 6, and if the card is valid, the retailer enters the amount of the transaction on the keypad 8. The printer 7 then prints a voucher, which includes information about the transaction.

The total bandwidth available for stereo broadcasts is 75 kHz, of which only 53 kHz is used. Thus, allowing an adequate guard space, it is possible to transmit extra information within the available space without interfering with the stereo broadcast. In the case of Ireland, it has been found that the national broadcasting station transmits data at the rate of 1,187.5 bits per second. Thus, it would require 53.9 ms to transmit a 16-digit serial number, or 20 such numbers could be transmitted per second. This represents a very light loading on the channel. In practice, however, credit card numbers could be condensed to about half their normal length. This is achieved by omitting the digits which specify the country in which the credit card recipient resides.

Referring now in more detail to the communication between the verifier 1 and the radio broadcast station or the central control computer, the CPU 2 is programmed to establish and to close down links with the central control computer to communicate with it in both directions. The CPU 2 can also, upon a user's request, perform the following functions with the VHF receiver/demodulator:

switch it on or off;
tune the receiver via an analog to digital converter;
enable/disable the receiver; and
automatically control the receiver's frequency of operation.

Further, the CPU 2 is programmed to receive the following inputs from the VHF receiver/demodulator:

Automatic Gain Control voltage level to allow monitoring of the signal strength from the receiver;
Phase Lock Loop indications if VHF data signals are being broadcast from the broadcast station;
data signals from the broadcast station; and
data clock.

In operation, the broadcast station will transmit data which informs the verifier 1 when the next data transmission is to take place. The CPU 2 then stores a value corresponding to the time a broadcast will take place in the real-time clock. When the verifier 1 is switched off, power is supplied by the batteries to the real-time clock, the memory bank 3, and the VHF receiver/demodulator 10 and when a data transmission is about to take place the real-time clock will transmit a signal to the CPU 2 to switch on the apparatus.

The verifier 1 is programmed to receive 26 bit words transmitted from the broadcast station. Each 26 bit word includes 10 check bits, which are used for error detection.

The verifier 1 will not be described in more detail. The CPU 2 comprises a microprocessor of the Motorola 6803 type, having Read Only Memory (ROM) and input/output drives having CMOS latches. The CPU 2 uses its own programmes and those stored in the RAM of the memory bank 3 to control the operation of the apparatus 1. These programmes will cause the CPU 2 to perform the following functions:

scan the keypad matrix to determine key depressions;
control the serial interface line to the printer 7;
monitor a mains fail signal;
monitor a low-battery signal to enable it to prevent loss of information stored in RAM; and
control of the modem 11.

The CPU 2 is programmed to receive initialisation information, both from the keypad 8 and from the central control computer via the modem 11 or from an adjacent computer via a serial link. The RAM in the memory bank 3 is continually powered by the battery, even when the rest of the verifier 1 is switched off. The software of the CPU 2 provides for entry of credit card details, both via the magnetic card reader 4 and via the keypad 7. The facility also provides for allowing either voice communication through the headset or data communication from the computer. It is envisaged that, upon receipt of instructions from the central control computer (via a telephone line) the verifier 1 may switch automatically to voice communication mode. Further, the verifier 1 can automatically switch between the two modes for receiving information, i.e. via the modem 11 and the VHF receiver/demodulator 10.

The CPU 2 is further programmed to provide extra features for the prevention of fraud. For example, if the last four digits of an account number are keyed in on the keypad 8 they will be compared with those from the magnetically encoded number. Further, the LCD 6 will display, upon request, the account number for comparison with the number embossed on the credit card. Additionally, the verifier 1 can verify a number such as a personal identification number by comparing it, when inputted on the keypad 8, with the corresponding number stored in its memory 3 or alternatively the verifier can transmit a signal to the central control computer to carry out a comparison.

The CPU 2 monitors the batteries to detect a low voltage condition. If the battery output voltage drops below a certain limit, the CPU 2 will complete its present task and will then activate a low battery indicator LED. The CPU 2 will then activate the battery charging circuit and the verifier 1 will resume operation when the voltage has increased to a sufficiently high level.

The CPU 2 also receives a signal from the magnetic card reader 4 which indicates whether or not a card is present. If the verifier 1 is switched off, such a signal will immediately switch the verifier back on. This feature is achieved by the incorporation of a card detector in the card reader slot 5. This detector will remain activated even when the apparatus is switched off. It is envisaged that a power on/off switch will not be required because the apparatus will remain off until either radio-transmitted information is received or a card is introduced into the card reader slot 5.

The VHF receiver/demodulator 10 includes an internal antenna for supplying the radio frequency signal. It also includes a tuner which uses varicat diodes to tune the input stage and the local osilator. Bipolar transistors are used to reduce current requirements and the circuit operates on a 5 V D.C. supply. The tuner may be electronically controlled by the CPU 2. This is achieved by monitoring the DC output level of the frequency discriminator or the automatic gain control level and discriminator. The automatic gain control level will give an indication of the signal level. Automatic frequency control is also implemented when a radio transmission is found.

If a card number is partially received the portion of the number which is received will be stored and compared with the numbers in the next transmission. It is envisaged that information on invalid credit cards will be transmitted on at least three different occasions to reduce the possibility of the information not being received.

As stated above, the CPU 2 can switch between the different modes of receiving information via the VHF receiver/demodulator 10 or via the modem 11.

The modem 11 includes the following features:
300 baud operation;
automatic dialing facility which complies with CCITT V21 recommendations for Europe of Bell 103 for U.S.A. or similar;
asynchronous 2 line full-duplex operation;
dial on-hook or off-hook;
last number redial;
detects "line-in-use" condition;
the facility for allowing a number of different units to use same telephone line;
automatic dialing; and
automatic answering.

The modem 11 will enable the apparatus to communicate direct exchange lines and private automatic branch exchange systems, thus enabling the verifier to establish a data communications link with the central control computer and the card issuer's computer, using the automatic dialing facility provided.

The manner in which the verifier 1 connects to a cable to communicate on-line with the central control computer or with the card issuing company's computer does not form part of the invention and therefore it requires no further description.

It will be appreciated that the on-line connection between the verifier 1 and the central control computer may be used in many ways to ensure that the verifier is kept up to date. For example, the central control computer may, at regular periods, dump details of all of the invalid cards to the verifier 1 for comparison with what is stored in the memory bank 3. Any errors can then be corrected. Generally speaking, the verifier 1 will store transaction data and will transmit this data to the card issuing company headquarters at regular intervals. The communications expense involved in this is not nearly so high as a call for each transaction because all of the information for a period is transmitted at one time.

It will further be appreciated that because the verifier 1 is adapted to receive data by radio transmission, it may operate independently of any telecommunications network. By utilising this method of communications the apparatus 1 can be updated off-line, greatly reducing communications costs. Further, because the verifier 1 need not be switched on all of the time power costs are low and the life of the apparatus is greatly increased.

It will be appreciated that the verifier could be used for verifying any type of card, for example, a bank card, an identification card, or indeed, in certain cases it could be used for passports if data were contained on it suitable for reading by electronic or other suitable means. It will also, of course, be appreciated that while the invention has been described using a magnetic card reader, any other type of reader could be used, for example, a light reader, or a laser reader.

Additionally, it will be appreciated that while the verifier has been described as comprising a CPU, this may not be essential. It is envisaged that in certain basic versions of the invention, the CPU may be dispensed with.

It will also be appreciated that it is not necessary for a printer or an LCD to be provided. For example, a light or an audible alarm may be used when an invalid card has been presented.

It will further be appreciated that the verifier according to the invention may be adapted to receive signals other than those in the VHF frequency range, for example, it is envisaged that the verifier may be adapted to receive radio signals anywhere in the radio wave frequency range of $10^4$ to $10^{11}$ Hz. It is also envisaged that in certain cases the VHF signal may be provided on other carriers besides a stereo broadcast.

An alternative way of viewing the invention is that what has been done is to duplicate the credit card company's files at each terminal. This appears to be a relatively simple reversal of procedure, but it is not by any means so. It required a radical examination of the operation of credit card verification and a non-obvious solution to the problem in that it is a reversal of the way in which, for example, automatic cash dispensing machines now operate where an instantaneous inter-action between each terminal and the central computer is essential. Any breakdown in the communication causes a shut-down of one or more terminals, while any fault at the central computer leads to a breakdown of the whole system. With the present invention, a breakdown in the central computer of the credit card company only effects up-dates at the credit card verifier and a breakdown in communication, while unlikely, will effect only individual credit card verifiers.

It will be appreciated that with the present system of credit card verification that all credit card transactions cannot be checked. The volume and cost of the communications traffic would be excessive. Therefore credit card companies set credit limits for various transactions where specific authorization for acceptance of the card has to be obtained. This is a totally inadequate method of eliminating fraud. The present invention virtually does so, once a card is stolen it can be "stopped" instantaneously and additionally all credit cards are checked for every transaction. Therefore there is in effect no limit for checking. The present invention allows a much more versatile credit control procedure to be installed.

Those involved in credit control will appreciate how the system may be operated to provide any credit limits and checks as may be desired. The credit card company's liability for loss in respect of stolen cards once loss is reported is obviously greatly reduced.

While the verifier has been described as being battery operated, it will be appreciated that it may be powered by any suitable means.

That which is claimed is:

1. A method for verifying a credit card comprising the steps and sequence of:
   receiving a preparatory radio signal;
   activating input circuitry for a signal storage device a pre-set time after the preparatory radio signal;
   receiving an information radio signal containing information relating to invalid credit cards from a central control station;
   storing the information received to form a memory bank of stored data;
   de-activating the input circuitry of the signal storage device;
   inserting a card into the verifier;
   reading encoded data on the card;
   comparing the stored and encoded data; and
   rejecting or accepting the card in response to the comparison.

2. A credit card verifier comprising:
   means for receiving a preparatory radio signal from a central control station;
   a signal storage device;
   input circuitry for the signal storage device for reception of an information radio signal;
   means for activating the input circuitry a pre-set time after reception of the preparatory radio signal;
   means for de-activating the input circuitry after reception of the information radio signal and storage of the information received as stored data;
   means for reading encoded data on a credit card presented at the credit card verifier;
   means for comparing the stored and encoded data; and
   means for delivering a signal indicating validity of the presented credit card in response to said comparison.

3. A credit card verifier as recited in claim 2 in which the means for receiving preparatory and information radio signals comprises a VHF receiver and associated demodulator.

4. A credit verifier as recited in claim 2, further comprising a keyboard and associated equipment for inputting information and transaction data into the verifier and means for storing said transaction data.

5. A credit card verifier as recited in claim 2 further comprising serial transmission means for transmission by cable of transaction data to the central control station and for reception of information on invalid credit cards.

6. A credit card verifier as recited in claims 2 in which a printer is provided for the transaction data.

* * * * *